(12) United States Patent
Reed

(10) Patent No.: US 6,754,504 B1
(45) Date of Patent: Jun. 22, 2004

(54) METHOD AND APPARATUS FOR CONTROLLING ENVIRONMENTAL CONDITIONS USING A PERSONAL AREA NETWORK

(75) Inventor: John Douglas Reed, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 789 days.

(21) Appl. No.: 09/590,604

(22) Filed: Jun. 10, 2000

(51) Int. Cl.[7] .............................. H04B 7/00; H04Q 7/20
(52) U.S. Cl. ................. 455/517; 455/414.1; 455/414.2; 455/414.3; 455/418; 455/456.2; 455/419
(58) Field of Search ............................. 455/517, 414.1, 455/414.2, 414.3, 414.4, 415, 418, 456.2, 41.2, 419, 412.1, 426.2, 456.1

(56) References Cited

U.S. PATENT DOCUMENTS

| | | | | |
|---|---|---|---|---|
| 5,081,707 | A | * | 1/1992 | Schorman et al. ........ 455/186.1 |
| 5,784,546 | A | * | 7/1998 | Benman, Jr. ............. 715/500.1 |
| 5,943,414 | A | * | 8/1999 | McIntee et al. ........ 379/220.01 |
| 6,023,223 | A | * | 2/2000 | Baxter, Jr. .................. 340/531 |
| 6,188,886 | B1 | * | 2/2001 | Macaulay et al. .......... 455/415 |
| 6,198,920 | B1 | * | 3/2001 | Doviak et al. ............ 455/426.1 |
| 6,226,512 | B1 | * | 5/2001 | Macaulay et al. ....... 455/414.1 |
| 6,405,034 | B1 | * | 6/2002 | Tijerino .................... 455/414.3 |
| 6,405,035 | B1 | * | 6/2002 | Singh ....................... 455/414.1 |
| 6,418,324 | B1 | * | 7/2002 | Doviak et al. ........... 455/426.1 |
| 6,476,728 | B1 | * | 11/2002 | Sakakibara ............ 340/870.02 |
| 6,560,453 | B1 | * | 5/2003 | Henry et al. ............. 455/67.11 |
| 6,594,242 | B1 | * | 7/2003 | Kransmo .................... 370/331 |

* cited by examiner

Primary Examiner—Marceau Milord
(74) Attorney, Agent, or Firm—Charles W. Bethards; Hisashi D. Watanabe

(57) ABSTRACT

A method and apparatus for controlling the environmental conditions within a predefined area based on a network user's preferences using a personal area network is provided. The personal area network includes at least one portable communication unit associated with a network user, and has stored therein the environmental preferences (e.g., preferred temperature settings, lighting and sound conditions, etc.) of the network user for a given area (e.g., a conference room of an office building). According to one embodiment, a controller detects the presence of each portable communication unit located within the predefined area and obtains each network user's preferences from their associated portable communication units. In one embodiment, the controller considers all of the preferences of the users present within the predefined area and formulates an optimal environmental condition setting based upon all the users' preference obtained. The controller then controls the environmental conditions within the predefined area accordingly.

17 Claims, 3 Drawing Sheets

METHOD AND APPARATUS FOR CONTROLLING ENVIRONMENTAL CONDITIONS USING A PERSONAL AREA NETWORK

FIELD OF THE INVENTION

This invention relates generally to the field of wireless communications, and, more particularly, to a method and apparatus for controlling environmental conditions using a personal area network.

BACKGROUND OF THE INVENTION

Generally, when employees of a company, for example, work in a comfortable environment, they tend to be more productive, thus providing inherent benefits for the employer. Several environmental factors within the work environment may affect an employee's ability to work effectively. These factors may include the temperature of the work environment, the lighting and sound conditions within the environment, as well as several other factors.

Typically, the environmental conditions preferred by one employee may differ considerably from another. For example, one employee may prefer to work in a warmer setting, while another may prefer a cooler surrounding. Another employee may prefer to work in an environment having a very high light intensity. While another employee may find the bright lights to be a nuisance, and thus detract from the employee's ability to work effectively.

Employees typically work in common areas of an office building, such as cubicals, where most of the employees are exposed to the same environmental conditions. The reason for a company creating a common area work environment mainly results from cost. That is, it would be very impractical from a monetary standpoint to provide each employee with their own enclosed office and their own controls for individual settings for temperature, lighting, etc. This is especially the case, when the number of employees are in the thousands.

While a company may save in construction costs by creating these common work areas, the employees may be less productive by being exposed to undesirable environmental conditions. This loss in productivity by a company's employees can adversely impact the company's profits.

The present invention is directed to overcoming, or at least reducing the effects of, one or more of the problems set forth above.

BRIEF DESCRIPTION OF THE DRAWINGS

The invention may be understood by reference to the following description taken in conjunction with the accompanying drawings, in which like reference numerals identify like elements, and in which.

Figure 1:
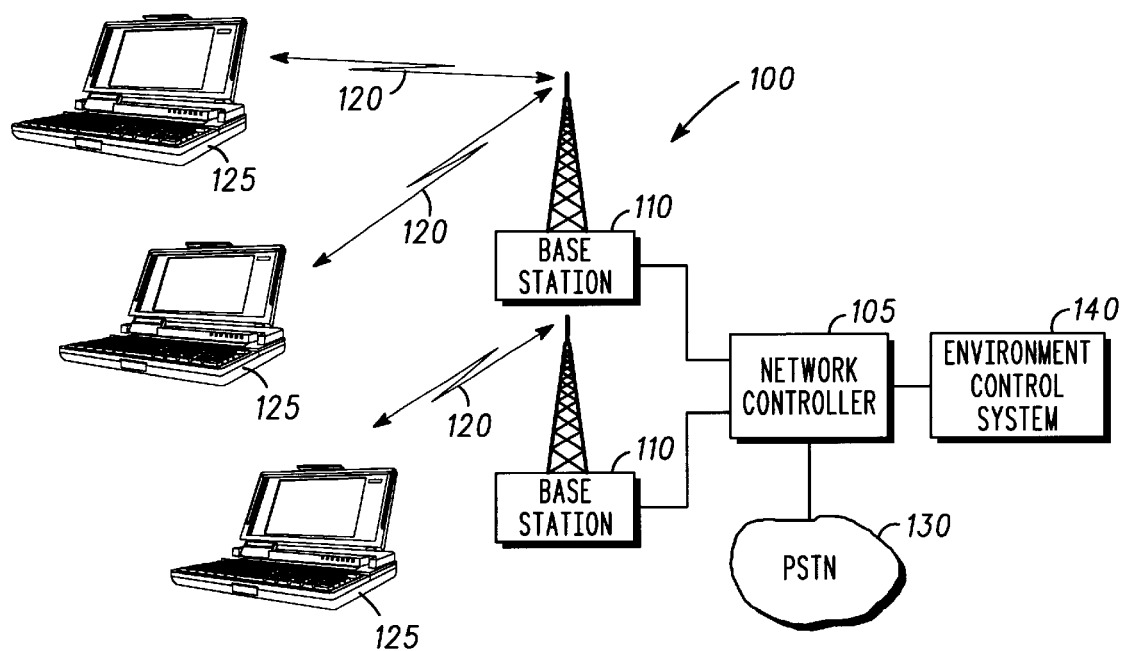
FIG. 1 illustrates a personal area network for controlling environmental conditions within a predefined area based upon user preferences according to one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. In particular it may be advantageous or preferred that the methods and apparatus described herein be implemented in part utilizing software. Such software, given the teachings below, would be well within the wherewithal of one of ordinary skill, thus further disclosure thereof would only server to obscure the present invention.

Turning now to the drawings, and specifically referring to FIG. 1, a personal area network 100 that is configured to control environmental conditions within a predefined area based upon user preferences is shown in accordance with one embodiment of the present invention. The personal area network 100 comprises a network controller 105 for controlling the overall operation of the network 100. In particular, the network controller 105 manages voice and data communication within the network 100, and provides control of the network user's preferred environmental conditions within a predefined area, such as a room within a building, for example.

A plurality of base stations 110 are coupled to the network controller 105 to enable wireless communication between the network controller 105 and a plurality of portable communication units 125, which are carried by the users of the network 100. According to one embodiment, the base stations 110 communicate with the portable communication units 125 over a low power radio frequency (RF) link 120. It will be appreciated, however, that the base stations 110 and communication units 125 may be configured to communicate via alternative communication mediums either in addition to the RF link 120 or in lieu thereof. Such an alternative communication medium may include, but need not be limited to, infrared (IR) communication, for example.

The portable communication units 125 include wireless personal digital assistants (PDAs) in the illustrated embodiment, which are capable of providing voice and data communication for the network user. It will be appreciated that the portable communication units 125 may alternatively be embodied as a two-way pager, a radiotelephone in the form of a cordless, cellular, personal communication system (PCS) or other similar-type telephones without departing from the spirit and scope of the present invention. It is also envisioned that a standard air interface may be used within the operating environment to provide communication between the base station 110 and the portable communication units 125. For example, an air interface standard, such as a Bluetooth standard, the home RF standard (IEEE 802.11), or other standards may be used. It will further be appreciated that the personal area network 100 may support multiple standards within the same area.

In one embodiment, the network controller 105 is coupled to the public switched telephone network (PSTN) 130 to permit voice and/or data communication between the portable communication units 125 of the network 100 and various other communication devices (not shown) that are interconnected via the PSTN 130. These other communication devices may include, but are not necessarily limited to, telephonic devices, computers, the Internet, etc.

From the above discussion of one embodiment it will be evident that the base station and controller functions can be performed by the master unit or a pod in a Bluetooth based ad-hoc network provided the environmental control system is Bluetooth equipped and accessible.

In the illustrated embodiment, an environment control system 140 is also coupled to the network controller 105 to enable control of various environmental conditions within the predefined area, such as control for heating, air conditioning, lighting, sound etc. In one embodiment, the environment control system 140 includes the building's heating and air conditioning system, for example, for either raising or lowering the temperature within the predefined area in accordance with the network user's preferences. Of course, the environment control system 140 would include various other components for controlling other environmental factors within the predefined area, such as a humidifier or de-humidifier for controlling the humidity, a control for the building's lighting and sound system, etc.

In accordance with one embodiment, the personal area network 100 resides in an office building environment, and the base stations 110 are strategically deployed within the areas of the office building to provide continuous radio communication coverage throughout. For example, the base stations 110 may be deployed in conference rooms, work areas, corridors, etc. of the office building, thus creating multi-zoned radio communications coverage areas throughout the building. The portable communication units 125 may maintain continuous communication between these coverage areas by conventional handoff techniques that are well established in the art. It will further be appreciated that the personal area network 100 may alternatively be deployed in a home environment, for example or various other environments, and, thus, need not be limited to an office environment as provided in the illustrated embodiment.

In accordance with one embodiment of the present invention, the network controller 105 tracks the location of the users within the network 100 based upon the base station 110 with which their associated portable communication unit 125 is communicating. Each portable communication unit 125 has stored therein an environmental preference profile, which includes the network user's preferences for environmental conditions within the predefined area within which the network user is located. The environmental conditions may include temperature setting, light intensity, sound level, etc. within the predefined area in which the user is present. Based upon the preferences transmitted from each portable communication unit 125 within the predefined area, the network controller 105 determines an optimal environmental control setting based upon the preferences transmitted from the plurality of users. For example, if a plurality of users (and their associated portable communication units 125) are present within a conference room of the office building, the network controller 105 determines the presence of the users within the conference room, obtains their preferences for environmental conditions within the room, such as temperature setting, for example, and formulates an optimal temperature setting for the conference room based on the various temperature setting preferences from all those users present within the conference room. The network controller 105 then forwards a signal to the environment control system 140 to have the optimal temperature set in the conference room of the building.

Figure 2:
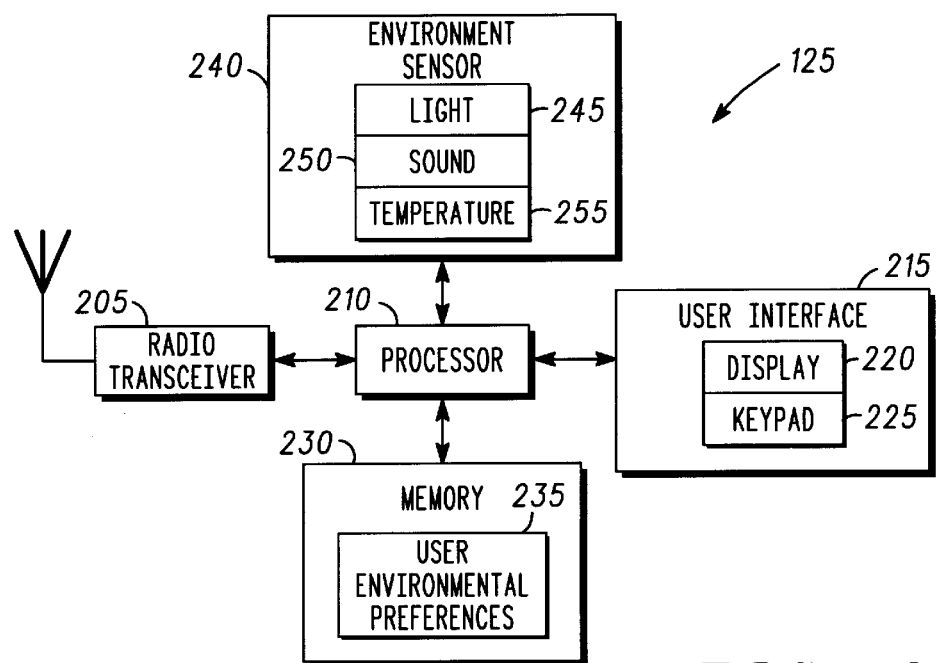
FIG. 2 shows a block diagram of a portable communication unit that is associated with a user of the personal area network of FIG. 1.

Turning now to FIG. 2, a more detailed representation of the portable communication units 125 associated with the network users is provided. As discussed, the portable communication unit 125 is a wireless PDA or a cell phone in the illustrated embodiment; however, it may take the form of various other wireless communications devices, such as a pager, radiotelephone, or the like. The portable communication unit 125 includes a radio transceiver 205 that is adapted to communicate over the RF link 120 with the base station 110. As previously mentioned, the radio transceiver 205 may be either supplemented or replaced with appropriate circuitry to support an alternative communication medium between the portable communication unit 125 and the base station 110.

The radio transceiver 205 is coupled to a processor unit 210, which controls the overall operation of the portable communication unit 125. A user interface 215 is also coupled to the processor unit 210 to enable user control of the communication unit 125. In accordance with one embodiment, the user interface 215 includes a display 220 and a keypad 225 to enable user interaction with the portable communication unit 125.

A memory 230 is also coupled to the processor 210 to store various software programs needed by the processor or various data related to the user of the communication unit 125. In particular, the memory 230 stores a user's environmental preferences 235, which define the user's preferred environmental conditions within or without the predefined area in which the user is present. The environmental preferences 235 may be programmed into the memory 230 via the user interface 215, for example. The portable communication device 125 may optionally be configured with an environmental sensor 240, which may include light, sound, or temperature sensors 245, 250, 255 to monitor the current lighting, sound or temperature conditions in the vicinity of the portable communication unit 125 within the predefined area. The current environmental conditions ascertained by the portable communication unit 125 may then be transmitted to the network controller 105 as an indication of current environmental conditions within the predefined area. It will be appreciated that various other types of sensors relating to environmental conditions within the predefined area may also be used without departing from the spirit and scope of the present invention.

Figure 3:
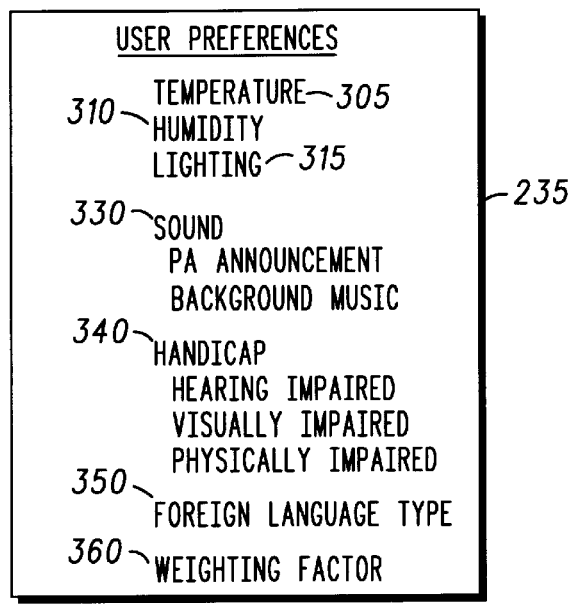
FIG. 3 illustrates a user's environmental preferences that are stored in the portable communication unit of FIG. 2.

Turning now to FIG. 3, a more detailed representation of the network user's environmental preferences 235 that are stored within the memory 230 of the portable communication unit 125 is provided. The environmental preferences 235 indicate the network user's preference for the environmental conditions of the predefined area in which he or she is present. In particular, the user preferences 235 may include a temperature setting 305 in which the user of the portable communication unit 125 desires the area (e.g., a conference room) to be set to. For example, the user's preferred temperature setting may be 65° F., which would be indicated in the temperature setting field 305 of that particular user's portable communication unit 125. It will further be appreciated that the temperature (or other environmental factors) may be controlled differently within various sections of a large room depending on which section within the room a particular user is located. For example, a large room accommodating 300 or more people may be divided into six different heating/air conditioning zones. Based on the users' locations within those zones, the network controller 105 may be configured to determine a different temperature setting for each zone within the room based on the users' preferences within each individual zone. Finding the location of a particular user within a building and/or a section of a room is well known to those of ordinary skill in the art. Examples of location finding techniques known in the art include signal strength comparisons to detect a specific user's proximity to a particular base station 110, the use of directional antennas to determine the angle of arrival of the signal etc.

In addition to temperature preference, the user may also desire to indicate a preferred room humidity setting 310, and preferred lighting conditions 315 within the predefined area, such as interior lighting intensity, which may be indicated as a low, medium or high intensity, for example. The user may also indicate the amount of natural light desired, in which case curtains or blinds of a room with windows may be controlled in accordance with the user's natural light preference. That is, if the network user prefers more natural light in a room, the room's curtains or blinds may be automatically opened when the network controller 105 determines that the user is present within the room. The controller 105 may also be configured to determine when certain preferences are irrelevant or inappropriate, such as the desire for natural light when it is during evening hours (i.e., when it is dark outside).

A sound field 330 may also be provided in the environmental preferences 235 indicating the sound level in which announcements and/or background music is desired (e.g., low, medium or high volume or on a scale from one to ten, with one being the lowest volume and ten being the highest). For example, the sound field 330 may provide an indication for the sound level of emergency announcements, specific verbal instructions, or alarms within the predefined area.

A handicap field 340 may also be provided to indicate whether the user of the portable communication unit 125 is hearing, visually, or physically impaired. For example, if the user is visually impaired, a heavier weight may be placed on the user's lighting preferences than that of other users who are not visually impaired. Alternatively, a blind person would not be given any consideration. Likewise, those users indicating that they are hearing impaired may also be given a heavier emphasis on their sound preferences within the predefined area. The network controller 105 may be further configured to ignore the preferences from other users that are located within the same space as a handicap individual, for example. The handicap field 340 may also be used to indicate various medical conditions of the individual, such as a heart condition, for example. Additionally, the handicap field 340 may also be used to direct security, medical, or other personnel within the building to assist with the special needs of the handicap individual. For example, if a handicapped individual who is hearing impaired is scheduled to attend a meeting in a conference room, the handicap field 340 may be used to apprise building personal that there is a need for a special hearing device in the conference room for that individual, or a sign language interpreter, etc.

The user preferences 235 may also indicate a foreign language type field 350, which may indicate the user's language preference. The language type field 350 may even further indicate if it is the only language spoken by the user. For example, if the user indicates that he or she only speaks Spanish, announcements made over the public address (PA) system, for example, that are usually only provided in English may be followed with a Spanish translation, providing that a Spanish-only speaking individual is present within the predefined area.

It will be appreciated that the user's environmental preferences 235 may include various other parameters (in addition to the examples provided) that are appropriate for controlling the environmental conditions of the predefined area in which the user is located. For example, the user's preferences 235 may include different types of services that are to be supplied to individuals within the predefined area, such as the types of snacks and/or beverages an individual desires to be served at a meeting. The user preferences 235 may also include in addition to desired food or beverage types, preferences for types of entertainment, favorite television shows, images to be displayed in the area (e.g., a decoration or cultural symbol), types of music, favorite radio stations, languages spoken, religion, political preferences, or other specific likes or dislikes. The user preferences 235 may also include other information on the individual in addition to his or her preferences. For example, the age, gender, marital status, allergies or sensitivities to certain items within the predefined area (e.g., allergies to perfume), medical conditions, and various other personal attributes or preferences of the individual that may pertain to a specific location and/or event attended may be individual.

It will further be appreciated that the preferences 235 may apply to several different environments. For example, if the network 100 is deployed in a family's home, one user preference may be to mute the television sound when the telephone rings or the doorbell rings.

The environmental preferences 235 for each portable communication unit 125 user may further be provided with a weighting factor field 360, which may be used to weight the preferences of one user in relation to other users located within the same space of the network 100. For instance, a corporation's senior executive may be provided with the highest weighting factor of five, for example, while a low ranking employee may be given a weighting factor of one. Other types of weighting factors 360 may be based on a job code, a company employee number, etc. in which the network controller 105 may convert the job code or employee number to a weighting factor (e.g., on a scale from one to five). Similarly, a weighting factor may be taken into account when considering the network user's age. For example, an elderly person's preference may be given more weight by the network controller 105 for temperature setting, lighting and sound conditions within a given area.

Figure 4:
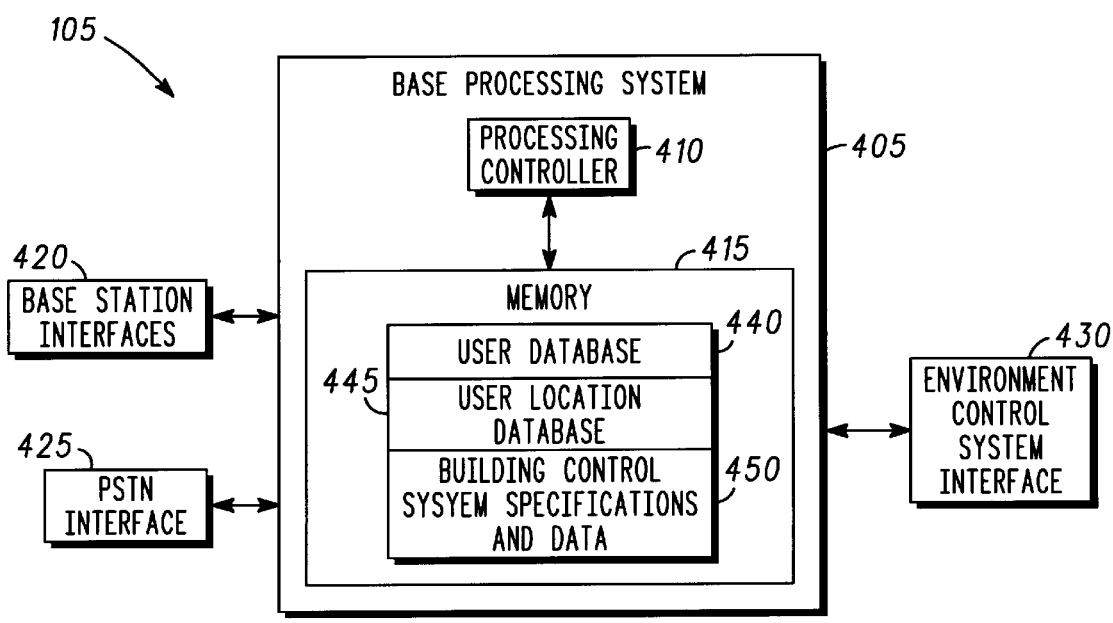
FIG. 4 shows a block diagram of a network controller for controlling the environmental conditions based on the network user's preferences.

Turning now to FIG. 4, a more detailed representation of the network controller 105 is provided. The network controller 105 includes a base processing system 405 that comprises a process controller 410, which controls the overall operation of the personal area network 100. The network controller 105 also includes a base station interface 420, which permits communication between the base stations 110 that are distributed throughout the building and the network controller 105. The base processing system 405 is also coupled to a PSTN interface 425, which enables connection to the PSTN 130, and is also coupled to an environment control system interface 430 for connection to the environment control system 140 of the physical space in which the network 100 is deployed.

A memory 415 is also coupled to the process controller 410 of the base processing system 405. The memory 415 includes a user database 440 for maintaining information on the subscribers/users of the personal area network 100. For example, the information provided in the user database 440 may include information for registration and authentication of the wireless portable communication units 125 associated with each user within the personal area network 100.

The memory 415 also includes a user location database 445, which maintains current location information for each portable communication unit 125 associated with the users registered within the personal area network 100. According to one embodiment, the base stations 110 may be configured to transmit a polling signal to the portable communication units 125 present within the base stations' coverage areas at predetermined intervals, such as every five minutes, for example. In response to receiving the polling signal, the portable communication units 125 that are present within a particular base station's coverage area transmit an identification signal to the base station 110, thereby identifying their location within the network 100 within the coverage area of the particular base station 10. In one embodiment, the users environmental preferences 235 are transmitted to the network controller 105 (via the base station 110) with the identification signal. It will be appreciated that each user's environmental preferences 235 may be alternatively stored within the network controller's memory 415 and cross-referenced with the identification of the user's: portable communication unit 125. In this alternative embodiment, the process controller 410 may retrieve the user's environmental preferences 235 from the memory 415 based upon the identifier sent by the portable communication unit 125.

The memory 415 further includes building control system specifications and data 450, which provides information on the building's environmental control systems in which the personal area network 100 is installed. The building control system specifications and data 450 also provides information as to which base station coverage areas within the building correspond to the various control zones of the building control system. For example, the control system specifications and data 450 will enable the process controller 410 to determine the heating and air conditioning control zone for a particular conference room within the building based on the base stations 110 with which the portable communication units 125 are communicating.

The specifications 450 may also establish operational limits within which the network controller 105 is required to stay. For example, there may be certain temperature ranges in which it is not economically feasible to run the building's air conditioning or heating system. That is, a lower limit of 65° F. and an upper limit of 75° F. may be established such that the building's air conditioning or heating system does not fall above or below this specified range regardless of the users' preferred temperatures. Additionally, the network controller 105 may be configured to turn on the building's air conditioning in a particular zone of the building, providing that a certain number of users are present within the particular area. For example, if the office building air conditioner is typically turned off on the weekend as a cost saving measure, the network controller 105 may be further configured to turn on the air conditioning within a particular work area of the building, providing that a predetermined number of users (e.g., five or more) are present within that particular work area. Alternatively, considering the example above, the network controller 105 may be further configured to only turn on the air conditioning system within the predefined area where an individual having a particular weighting factor 360 is present within such area.

Figure 5:
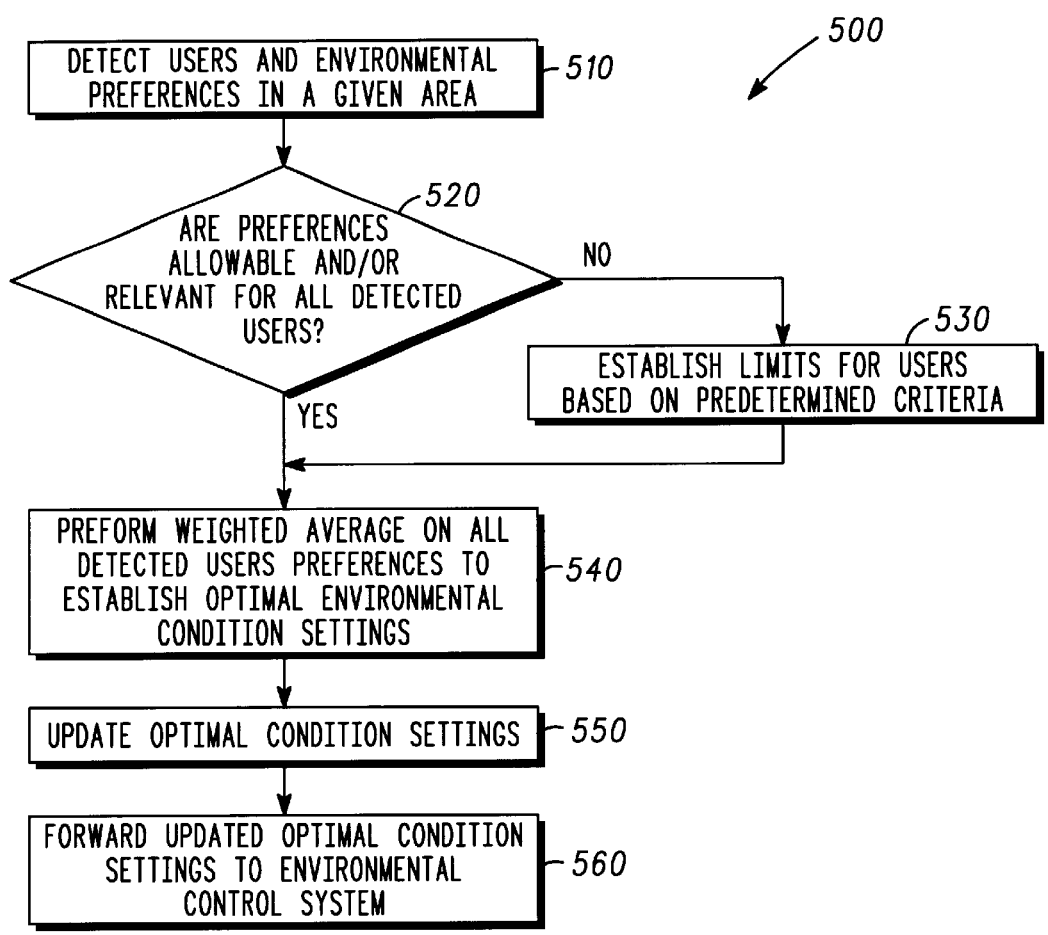
FIG. 5 illustrates a process for controlling environmental conditions within a given area based upon a network user's stored preferences.

Turning now to FIG. 5, a process 500 for controlling environmental conditions within a predefined area based on a user's environmental preferences is provided. The process 500 commences at block 510, where the network controller 105 detects network users within a predefined area and obtains the user's environmental preferences for the predefined area. According to one embodiment, the base station 110, which provides communication coverage for the predefined area, transmits a polling signal within the predefined area. In response to receiving the polling signal transmitted from the base station 110, the portable communication units 125, which are associated with the network users in the predefined area, transmit an identification signal to the base station 110, thereby identifying themselves to the network controller 105 as being present within the area. The portable communication units 125 also transmit their corresponding user's environmental preferences 235 that are stored in the memory 230. It will be appreciated that the preferences 235 for each user may alternatively be stored in a centralized database of the network controller 105, as opposed to being stored in each corresponding portable communications unit 125.

As previously discussed, the environmental preferences 235 may include a user's desired temperature setting, lighting and sound conditions, etc. for the predefined area within which the user is present. It will be appreciated that various other environmental factors may be considered either in addition to or in lieu of the examples provided. Of course, the applicability of the environmental preferences 235 may vary from one predefined area to another.

After collecting the environmental preferences 235 from the users in the predefined area, the network controller 105 determines whether these preferences are allowable and/or relevant for the user within the given area. For example, some users' environmental preferences 235 may fall outside of established operating limits as defined in the building control system specifications and data 450 that is stored in memory 415 of the network controller 105. That is, a user may have a preferred temperature setting of 80 degrees F., for example, but this temperature setting may not be economically feasible. Accordingly, the network controller 105 may be configured to disregard the user's preference or substitute other limits or preference for that particular temperature setting. Furthermore, certain preferences 235 of the user may not be relevant to the particular location where the user is currently present. For example, if the user prefers natural light and the area in which the user is present does not have any windows (as determined by the building control system specifications 450) this particular preference may be ignored. Also, even if the given area has windows, the network controller 105 may be configured to determine that it is dark outside, thus making the user's preference for natural light irrelevant. The network controller 105 may accomplish this by determining the time of day in which the user is present in the predefined area (e.g., if it is 8:00 p.m., a preference for natural light is not relevant). The network controller 105 may also be configured to determine whether or not a particular network user has the right for a particular environmental preference. That is, a particular preference for a low ranking employee may be disregarded, where such a preference is only allowed for a higher ranking employee, for example. Thus, a preference to have a room temperature of 65° F. during the summer months for a high ranking employee may be considered acceptable, it may be unacceptable for a lower ranking employee where his or her lower temperature limit may be set at 72° F., for example.

Continuing with the process 500, if certain preferences 235 are not allowable for some or all of the detected users in the area (as discussed above), the process 500 proceeds to block 530, where limits are established by the network controller 105 on those users' preferences 235. If the preferences for the detected users are allowable or have been determined at block 530, the network controller 105 performs a "weighted average" for the detected users' preferences to establish an optimal condition setting for those preferences at block 540. For example, with regard to temperature setting within the area, the network controller 105 may average the temperature setting preferences for the detected users and take into account additional factors, such as each user's weighting factor 360, whether the user has a handicap 340, etc. In one embodiment, the network controller 105 may use following formula to calculate the optimal condition setting based on temperature and weighting factor.

$$\text{Weighted Target Temperature} = (w_1 T_1 + w_2 T_2 + w_n T_n)/(w_1 + w_2 + w_n)$$

where: $w_n$ is the weighting factor for the nth user $T_n$ is the desired temperature of nth user In accordance with another embodiment, it will be appreciated that the controller 105 may be configured to accommodate all of the users' preferences, such as preferred beverages, for example, as opposed to determining the most popular beverage. Accordingly, the controller 105 need not necessarily average the users' preferences as described above with regard to temperature.

Upon determining the optimal environmental condition setting at block 540, the network controller 105 updates the optimal settings at block 550 as calculated at block 540 for each relevant user preference. It will be appreciated that the network controller 105 may be configured to update the optimal settings at predetermined time intervals to account for users entering or exiting the predefined area. At block 560, the network controller 105 then forwards the updated optimal settings to the environment control system 140, such that the appropriate environmental building component (e.g., air conditioning unit, heating unit, etc.) may be controlled accordingly to establish the desired environmental conditions in the predefined area.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

detecting the presence of at least one communication unit within a predefined area;

obtaining at least one environmental preference for an individual associated with the at least one communication unit located within the predefined area, the environmental preference defining a desired environmental condition by the individual within the predefined area;

assigning a weighting factor for each individual associated with each communication unit located within the predefined area, the weighting factor indicating an importance with which the environmental preference of the individual associated with one communication unit is held in relation to the preferences of other individuals; and controlling an environmental condition in the predefined area in accordance with the preference obtained from the at least one communication unit.

2. The method of claim 1, wherein detecting the presence of at least one communication unit within a predefined area further comprises:

transmitting a signal to the at least one communication unit; and awaiting an identifier signal transmitted from the at least one communication unit, the identifier signal including at least one environmental preference for the individual associated with the at least one communication unit.

3. The method of claim 1, further comprising:

obtaining environmental preferences from a plurality of communication units; and calculating an optimal setting for the environmental condition based at least in part upon the environmental preferences transmitted by each communication unit within the predefined area.

4. The method of claim 3, wherein controlling the environmental condition in the predefined area in accordance with the preferences obtained from each communication unit further comprises:

sending a control signal indicating the calculated optimal condition setting to an appropriate controller adapted to control the environmental condition within the predefined area.

5. The method of claim 1, farther comprising:

calculating an optimal condition setting based at least in part upon the environmental preferences transmitted by each communication unit within the predefined area and the weighting factor assigned thereto.

6. The method of claim 5, wherein controlling the environmental condition in the predefined area in accordance with the preferences obtained from each communication unit further comprises:

sending a control signal indicating the calculated optimal condition setting to an appropriate controller adapted to control the environmental condition within the predefined area.

7. The method of claim 1, further comprising:

establishing a set of limits for the environmental preference of at least one individual, the set of limits defining an acceptable environmental preference that falls within the set of limits.

8. The method of claim 7, further comprising:

determining whether the at least one environmental preference from an individual associated with each communication unit is permitted for the individual based upon the established limit for the individual.

9. An apparatus, comprising:

at least one communication unit, each communication unit being associated with an individual, and adapted to store at least one environmental preference defining a desired environmental condition by the individual within a predefined area;

at least one base station adapted to communicate with each communication unit within the predefined area; and a controller coupled to the at least one base station and adapted to detect the presence of the communication units within the predefined area, obtain the at least one environmental preference from each communication unit, assign a weighting factor for each individual associated with each communication unit located within the predefined area, the weighting factor indicating an importance with which the environmental preference of the individual associated with one communication unit is held in relation to the preferences of other individuals, and control an environmental condition in the predefined area in accordance with the preferences obtained from each communication unit.

10. The apparatus of claim 9, wherein the base station is further adapted to transmit a signal to the at least one communication unit, and await an identifier signal transmitted from each communication unit, the identifier signal including at least one environmental preference of the individual associated with each communication unit.

11. The apparatus of claim 9, wherein the controller is further adapted to calculate an optimal condition setting based at least in part upon the environmental preferences transmitted by each communication unit within the predefined area.

12. The apparatus of claim 9, wherein the controller is further adapted to calculate an optimal condition setting based at least in part upon the environmental preferences transmitted by each communication unit within the predefined area and the weighting factor assigned thereto.

13. The apparatus of claim 12, wherein the apparatus further comprises:

an environment control unit adapted to control the environmental conditions within the predefines area; and wherein the controller is further adapted to send a control signal to the environment control unit indicating the calculated optimal condition setting.

14. The apparatus of claim 9, wherein the controller is further adapted to establish a set of limits for the preferences of at least one individual, the set of limits defining an acceptable environmental preference that falls within the set of limits.

15. The apparatus of claim 14, wherein the controller is further adapted to determine whether the at least one environmental preference from an individual associated with each communication unit is permitted for the individual based upon the established limit for the individual.

16. The apparatus of claim 9, wherein the at least one communication unit includes one of a wireless personal digital assistant (PDA), a two-way pager, and a radiotelephone.

17. The apparatus of claim 9, wherein the environmental preference includes one of a temperature setting, humidity setting, lighting conditions, and sound conditions for the predefined area.

* * * * *